(12) United States Patent
Kwon et al.

(10) Patent No.: US 9,371,421 B2
(45) Date of Patent: Jun. 21, 2016

(54) CRYSTALLINE POLYAMIDE ESTER RESIN, METHOD FOR PREPARING THE SAME, AND ARTICLE INCLUDING THE SAME

(71) Applicant: Cheil Industries Inc., Gumi-si (KR)

(72) Inventors: So Young Kwon, Uiwang-si (KR); Jin Kyu Kim, Uiwang-si (KR); Seung Youb Bang, Uiwang-si (KR); Sang Kyun Im, Uiwang-si (KR); Jin A Je, Uiwang-si (KR); Ki Yon Lee, Uiwang-si (KR); Suk Min Jun, Uiwang-si (KR); Sung Chul Choi, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 212 days.

(21) Appl. No.: 13/948,396

(22) Filed: Jul. 23, 2013

(65) Prior Publication Data

US 2014/0187739 A1    Jul. 3, 2014

(30) Foreign Application Priority Data

Dec. 28, 2012    (KR) .................. 10-2012-0157671

(51) Int. Cl.
| | | |
|---|---|---|
| C08G 63/68 | (2006.01) |
| C08G 69/44 | (2006.01) |
| C08L 67/02 | (2006.01) |
| C09J 177/12 | (2006.01) |

(52) U.S. Cl.
CPC ................ C08G 69/44 (2013.01); C08L 67/02 (2013.01); C09J 177/12 (2013.01)

(58) Field of Classification Search
CPC ........ C08L 67/02; C08L 77/12; C09J 177/12; C08G 69/44; C08G 63/6886; C09D 177/12; Y10T 428/31551
See application file for complete search history.

(56) References Cited

U.S. PATENT DOCUMENTS

| | | | |
|---|---|---|---|
| 2,901,466 A | 8/1959 | Kibler et al. |
| 4,101,524 A | 7/1978 | Burzin et al. |
| 4,942,087 A * | 7/1990 | Motooka et al. ............... 428/332 |
| 5,672,676 A * | 9/1997 | Turner ......................... 528/335 |
| 5,939,519 A | 8/1999 | Brunelle |
| 7,993,755 B2 | 8/2011 | Hala et al. |
| 2010/0203275 A1 | 8/2010 | Hoffmann et al. |
| 2014/0134371 A1 | 5/2014 | Hoffmann et al. |

FOREIGN PATENT DOCUMENTS

| | | |
|---|---|---|
| CN | 101796099 A | 8/2010 |
| EP | 2022820 A1 | 2/2009 |
| JP | 08-217875 A | 8/1996 |

OTHER PUBLICATIONS

Search Report in counterpart European Application No. 13185162.8 dated Mar. 27, 2014, pp. 1-5.
Search Report in counterpart Chinese Application No. 201310404406.1 dated Sep. 6, 2015, pp. 1-7.

* cited by examiner

*Primary Examiner* — Gregory Listvoyb
(74) *Attorney, Agent, or Firm* — Additon, Higgins & Pendleton, P.A.

(57) ABSTRACT

A crystalline polyamide ester resin is prepared by copolymerizing (A) a dicarboxylic acid component, (B) a diamine component, and (C) a cyclic aliphatic diol component, and has a structure in which a dicarboxylic acid moiety derived from the dicarboxylic acid component (A), a diamine moiety derived from the diamine component (B) and a cyclic aliphatic diol moiety derived from the cyclic aliphatic diol component (C) are repeated. A molar ratio ((B):(C)) of the diamine component (B) to the cyclic aliphatic diol component (C) is about 80 to about 99:about 1 to about 20. The crystalline polyamide ester resin has a melting point (Tm) ranging from about 280° C. to about 320° C. and a crystallization temperature (Tc) ranging from about 260° C. to about 290° C. The crystalline polyamide ester resin can have excellent heat resistance, discoloration resistance and moldability.

13 Claims, No Drawings

CRYSTALLINE POLYAMIDE ESTER RESIN, METHOD FOR PREPARING THE SAME, AND ARTICLE INCLUDING THE SAME

CROSS-REFERENCE TO RELATED APPLICATION

This application claims priority under 35 USC Section 119 to and the benefit of Korean Patent Application 10-2012-0157671, filed Dec. 28, 2012, the entire disclosure of which is incorporated herein by reference.

FIELD OF THE INVENTION

The present invention relates to a crystalline polyamide ester resin, a method for preparing the same, and a product including the same.

BACKGROUND OF THE INVENTION

A high-temperature resistant polyamide can be obtained by polycondensation of an aromatic dicarboxylic acid or an aromatic diamine, and has a semi-aromatic and semi-crystalline structure. High-temperature resistant polyamide has considerably higher temperature resistance as compared to general polyamide products, and thus can be used in various fields requiring high-temperature resistance.

Examples of typical high-temperature resistant polyamide include PA4T, PA6T, PA9T, PA10T, PA11T, PA12T, and the like. For a high-temperature resistant polyamide prepared from a long chain diamine having nine carbon atoms or more, a homopolymer, or a copolymerized polymer prepared from a small amount of comonomer (dicarboxylic acid or diamine) may be used. Typically, for PA4T and PA6T, the homopolymer has a very high melting temperature, thereby makes it difficult to process the homopolymer.

In order to solve this problem, a large amount (several dozen %) of comonomers can be added to enhance melt processability. Examples of the comonomers for PA6T may include short chain and long chain aliphatic diamines, cyclic aliphatic diamines, branched aliphatic diamines, short chain and long chain aliphatic dicarboxylic acids, cyclic aliphatic dicarboxylic acids, branched aliphatic dicarboxylic acids, and the like. For PA6T, common comonomers may include adipic acid, isophthalic acid, and the like.

In a high-temperature resistant polyamide product for use as an LED reflector requiring excellent optical characteristics and discoloration resistance, a cyclic aliphatic dicarboxylic acid may be used instead of an aromatic dicarboxylic acid in order to produce products having excellent resistance to light/heat, or a monomer capable of enhancing glass transition temperature (Tg) in order to inhibit deterioration in physical properties of polyamide products at high temperature may be copolymerized. However, such copolymerization cannot prevent discoloration of polyamide exposed to air at high temperature.

Due to such drawbacks, high-temperature resistant polyesters may be used instead of high-temperature resistant polyamides for products in which discoloration resistance is an important physical property. However, polyesters are generally inferior to high-temperature resistant polyamides in terms of heat resistance. Further, irrespective of good discoloration resistance, polyesters have undesirable hydrolysis property and moldability under humid conditions.

Therefore, there is a need for a crystalline polyamide resin having better heat resistance and discoloration resistance than existing high-temperature resistant polyamide products and which is capable of improving moldability (crystallization rate), the lack of which is a drawback of polyester products.

SUMMARY OF THE INVENTION

The present invention is directed to a novel amide-ester hybrid product which can exhibit the advantages of high-temperature resistant polyamides and polyesters. The hybrid product can have better heat resistance and/or discoloration resistance than existing products, and may have improved moldability (crystallization rate), the lack of which is a drawback of polyester products.

Accordingly, the present invention provides a crystalline polyamide ester resin that can have excellent heat resistance, discoloration resistance and/or moldability, a method for preparing the same, and a product prepared from the same. The crystalline polyamide ester resin is prepared by copolymerizing (A) a dicarboxylic acid component, (B) a diamine component, and (C) a cyclic aliphatic diol component, and has a structure in which a dicarboxylic acid moiety derived from the dicarboxylic acid component (A), a diamine moiety derived from the diamine component (B) and a cyclic aliphatic diol moiety derived from the cyclic aliphatic diol component (C) are repeated, wherein a molar ratio ((B):(C)) of the diamine component (B) to the cyclic aliphatic diol component (C) is about 80 to about 99:about 1 to about 20, and wherein the crystalline polyamide ester resin has a melting point (Tm) ranging from about 280° C. to about 320° C. and a crystallization temperature (Tc) ranging from about 260° C. to about 290° C.

An end capping agent may include acetic acid, propionic acid, butyric acid, valeric acid, caproic acid, caprylic acid, lauric acid, tridecanoic acid, myristic acid, palmitic acid, stearic acid, pivalic acid, isobutyric acid, benzoic acid, toluic acid, α-naphthalene carboxylic acid, β-naphthalene carboxylic acid, methylnaphthalene carboxylic acid, and the like.

The present invention also relates to a method for preparing the crystalline polyamide ester resin. The method includes: copolymerizing (A) a dicarboxylic acid component, (B) a diamine component, and (C) a cyclic aliphatic diol component, wherein a molar ratio ((B):(C)) of the diamine component (B) to the cyclic aliphatic diol component (C) is about 80 to about 99:about 1 to about 20, and wherein the copolymerized crystalline polyamide ester resin has a melting point (Tm) ranging from about 280° C. to about 320° C. and a crystallization temperature (Tc) ranging from about 260° C. to about 290° C.

The present invention further relates to a molded article produced from the crystalline polyamide ester resin.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A crystalline polyamide ester resin according to one embodiment of the invention is prepared by copolymerizing (A) a dicarboxylic acid component, (B) a diamine component, and (C) a cyclic aliphatic diol component, and has a structure in which a dicarboxylic acid moiety derived from the dicarboxylic acid component (A), a diamine moiety derived from the diamine component (B) and a cyclic aliphatic diol moiety derived from the cyclic aliphatic diol component (C) are repeated, wherein a molar ratio ((B):(C)) of the diamine component (B) to the cyclic aliphatic diol component (C) is about 80 to about 99:about 1 to about 20, and wherein the crystalline polyamide ester resin has a melting point (Tm) ranging from about 280° C. to about 320° C. and a crystallization temperature (Tc) ranging from about 260° C. to about 290° C.

As used herein, the term "dicarboxylic acid component" refers to dicarboxylic acid, alkyl esters thereof ($C_1$ to $C_4$ lower alkyl ester, such as monomethyl, monoethyl, dimethyl, diethyl or dibutyl ester and the like), acid anhydrides thereof, and the like, and combinations thereof. The dicarboxylic acid component is reacted with a diamine component and a cyclic aliphatic diol component to form a dicarboxylic acid moiety. Further, the dicarboxylic acid moiety, diamine moiety and cyclic aliphatic diol moiety refer to a residue left behind after a hydrogen atom, a hydroxylic group or an alkoxy group is removed when the dicarboxylic acid component, diamine component and cyclic aliphatic diol component are polymerized.

(A) Dicarboxylic Acid Component

As the dicarboxylic acid component (A), any dicarboxylic acid component used in a typical polyamide resin may be used. For example, a compound including at least one of $C_8$ to $C_{20}$ aromatic dicarboxylic acid components, $C_8$ to $C_{20}$ cyclic (aliphatic) dicarboxylic acid components, and mixtures thereof may be used.

The aromatic dicarboxylic acid component may provide high-temperature resistance to a polyamide ester resin. Examples of the aromatic dicarboxylic acid may include without limitation terephthalic acid, isophthalic acid, 2,6-naphthalene dicarboxylic acid, 2,7-naphthalene dicarboxylic acid, 1,4-naphthalene dicarboxylic acid, 1,4-phenylene dioxyphenylene acid, 1,3-phenylene dioxydiacetic acid, diphenic acid, 4',4'-oxybis(benzoic acid), diphenylmethane-4,4'-dicarboxylic acid, diphenylsulfone-4,4'-dicarboxylic acid, 4,4'-diphenyl carboxylic acid, and the like, and combinations thereof. In exemplary embodiments, the dicarboxylic acid component (A) can include terephthalic acid, isophthalic acid, and/or mixtures thereof, for example, can include terephthalic acid or a mixture of terephthalic acid and isophthalic acid.

Examples of the cyclic dicarboxylic acid component may include without limitation 2-cyclohexene-1,4-dicarboxylic acid, cyclohexane-1,1-dicarboxylic acid, trans-1,2-cyclohexanedicarboxylic acid, 1,4-cyclohexane-dicarboxylic acid, 1,3-cyclohexane-dicarboxylic acid, dimethylcyclohexane-1,4-dicarboxylate, and the like. These components may be used alone or in combination of two or more thereof.

In one embodiment, when the aromatic dicarboxylic acid component and the cyclic dicarboxylic acid component are used together, the dicarboxylic acid component (A) may include the cyclic dicarboxylic acid component in an amount of about 0.01 part by weight to about 50 parts by weight, for example about 5 parts by weight to about 30 parts by weight, based on about 100 parts by weight of the aromatic dicarboxylic acid component. In some embodiments, the dicarboxylic acid component (A) may include the cyclic dicarboxylic acid component in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 part by weight. Further, according to some embodiments of the present invention, the amount of the cyclic dicarboxyl is acid component can be in a range from about any of the foregoing amounts to about any other of the foregoing amounts.

When the dicarboxylic acid component (A) includes the cyclic dicarboxylic acid component in an amount within this range, the polyamide ester resin can be easily processed.

(B) Diamine Component

As the diamine component (B), any diamine component used in typical polyamide resins may be used. In order to enhance chemical resistance and moldability of the polyamide ester resin, for example, compounds containing at least one $C_1$ to $C_{20}$ aliphatic diamine component may be used. Examples of the aliphatic diamine component may include without limitation aliphatic linear diamines, such as 1,4-butanediamine, 1,5-pentanediamine, 1,6-hexanediamine (hexamethylenediamine), 1,7-heptanediamine, 1,8-octanediamine, 1,10-decanediamine, 1,12-dodecanediamine, 2-methyl-1,5-pentanediamine, 2,2,4-trimethyl-1,6-hexanediamine, 2,4,4-trimethyl-1,6-hexanediamine, 5-methyl-1,9-nonanediamine, 2,2-oxybis(ethylamine), bis(3-aminopropyl)ether, ethylene glycol bis(3-aminopropyl)ether (EGBA), 1,7-diamino-3,5-dioxoheptane, and the like, and combinations thereof. In exemplary embodiments, the diamine component (B) can include one or more $C_4$ to $C_{12}$ aliphatic diamines such as 1,4-butanediamine, 1,6-hexanediamine, 1,10-decanediamine, 1,12-dodecanediamine, and the like, and mixtures thereof. For example, the diamine component (B) can include 1,6-hexanediamine, 1,10-decanediamine, 1,12-dodecanediamine, and/or a mixture thereof.

(C) Cyclic Aliphatic Diol

In the present invention, the cyclic aliphatic diol serves to provide discoloration resistance to the polyamide ester resin and includes at least one $C_8$ to $C_{20}$ cyclic aliphatic diol component. Examples of the cyclic aliphatic diol can include without limitation 1,4-cyclohexane dimethanol (CHDM), 1,3-cyclohexane dimethanol, 2,2,4,4-tetramethyl-1,3-cyclobutanediol, and the like, and combinations thereof, for example 1,4-cyclohexane dimethanol (CHDM).

In the crystalline polyamide ester resin, the molar ratio ((B):(C)) of the diamine component (B) to the cyclic aliphatic diol component (C) is about 80 to about 99:about 1 to about 20. Namely, the diamine component (B) is present in an amount of about 80 mole % to about 99 mole %, for example about 82 mole % to about 97 mole %, and as another example about 85 mole % to about 95 mole %, based on the total mole % of (B)+(C).

In some embodiments, the diamine component (B) can be present in an amount of about 80, 81, 82, 83, 84, 85, 86, 87, 88, 89, 90, 91, 92, 93, 94, 95, 96, 97, 98, or 99 mole %. Further, according to some embodiments of the present invention, the amount of the diamine component (B) can be in a range from about any of the foregoing amounts to about any other of the foregoing amounts.

The cyclic aliphatic diol (C) is present in an amount of about 1 mole % to about 20 mole %, for example about 3 mole % to about 18 mole %, and as another example about 5 mole % to about 15 mole %, based on the total mole % of (B)+(C). In some embodiments, the cyclic aliphatic diol (C) can be present in an amount of about 1, 2, 3, 4, 5, 6, 7, 8, 9, 10, 11, 12, 13, 14, 15, 16, 17, 18, 19, or 20 mole %. Further, according to some embodiments of the present invention, the amount of the cyclic aliphatic diol (C) can be in a range from about any of the foregoing amounts to about any other of the foregoing amounts.

In the total of (B)+(C), when the diamine component (B) is present in an amount of less than about 80 mole %, or the cyclic aliphatic diol (C) is present in an amount of greater than about 20 mole %, the crystalline polyamide ester resin can have too a low melting point (Tm) and can suffer from deterioration in crystallinity and hydrolysis resistance. If the diamine component (B) is present in an amount of greater than about 99 mole %, or the cyclic aliphatic diol (C) is present in an amount of less than about 1 mole %, the crystalline polyamide ester resin can be deteriorated in discoloration resistance.

Further, in the crystalline polyamide ester resin, the ratio of the total mole ((B)+(C)) of the diamine component (B) and the cyclic aliphatic diol (C) to the mole of the aromatic dicarboxylic acid component (A), i.e., (((B)+(C))/(A)), is for example, about 0.9 to about 1.3, and as another example about 0.95 to about 1.25. Within this range, any deterioration in physical properties owing to unreacted monomers can be prevented, and heat resistance, discoloration resistance and moldability of the crystalline polyamide ester resin can be improved.

The terminal group of the crystalline polyamide ester resin according to the present invention may be encapsulated with an end-capping agent. Examples of the end-capping group can include without limitation aliphatic carboxylic acids, aromatic carboxylic acids, and the like, and mixtures thereof.

Examples of the end capping agent may include without limitation acetic acid, propionic acid, butyric acid, valeric acid, caproic acid, caprylic acid, lauric acid, tridecanoic acid, myristic acid, palmitic acid, stearic acid, pivalic acid, isobutyric acid, benzoic acid, toluic acid, α-naphthalene carboxylic acid, β-naphthalene carboxylic acid, methylnaphthalene carboxylic acid, and the like, and combinations thereof.

The end capping agent can be present in an amount of, optionally, about 5 parts by mole or less, for example about 0.01 part by mole to about 3 parts by mole, based on about 100 parts by mole of the dicarboxylic acid component (A), the diamine component (B) and the cyclic aliphatic diol component (C). In some embodiments, the end capping agent can be present in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by mole. Further, according to some embodiments of the present invention, the amount of the end capping agent can be in a range from about any of the foregoing amounts to about any other of the foregoing amounts.

The crystalline polyamide ester resin has a melting point (Tm) ranging from about 280° C. to about 320° C., for example from about 290° C. to about 310° C. When the melting point of the crystalline polyamide ester resin is less than about 280° C., the resin can have deteriorated heat resistance. When the melting point of the crystalline polyamide ester resin exceeds about 320° C., the resin can have deteriorated processability. When the crystalline polyamide ester resin has a melting point ranging from about 280° C. to about 320° C., the resin can exhibit excellent processability and high-temperature resistance.

The crystalline polyamide ester resin has a crystallization temperature (Tc) ranging from about 260° C. to about 290° C., for example about 270° C. to about 280° C. When the crystallization temperature of the crystalline polyamide ester resin is less than about 260° C., the resin can have low crystallization rate and moldability. When the crystallization temperature of the crystalline polyamide ester resin exceeds about 290° C., the resin can have low moldability, and injection molding conditions can become complicated, thereby making it difficult to perform injection molding of small parts. When the crystalline polyamide ester resin has a crystallization temperature ranging from about 260° C. to about 290° C., the resin can have excellent processability.

Further, the ratio (Tm/Tc) of the melting point (Tm) to the crystallization temperature (Tc) of the crystalline polyamide ester resin is about 1.07 to about 1.23, for example from about 1.07 to about 1.15. Within this range, the polyamide ester resin can have excellent moldability.

The crystalline polyamide ester resin has a glass transition temperature (Tg) ranging from about 110° C. to about 140° C., for example from about 110° C. to about 120° C. Within this range, the polyamide ester resin can have excellent heat resistance.

The crystalline polyamide ester resin has an enthalpy of fusion of about 40 J/g to about 80 J/g, for example about 60 J/g to about 80 J/g, as measured by DSC (Differential Scanning calorimeter). Within this range, the polyamide ester resin can exhibit excellent crystallinity.

The crystalline polyamide ester resin has an enthalpy of crystallization of about 40 J/g to about 60 J/g, for example about 40 J/g to about 55 J/g, as measured by DSC. Within this range, the polyamide ester resin can exhibit excellent crystallinity.

The crystalline polyamide ester resin has an inherent viscosity of about 0.6 dL/g to about 1.0 dL/g, for example 0.7 dL/g to 1.0 dL/g, as measured using an Ubbelohde viscometer in o-chlorophenol solution at 25° C. Within this range, the crystalline polyamide ester resin can exhibit excellent heat resistance, discoloration resistance, moldability, and the like.

Discoloration resistance of the crystalline polyamide ester resin is determined as follows. Colors (L*, a*, b*) of the prepared crystalline polyamide ester resin are measured in accordance with ASTM D 1209, followed by performing scorch testing wherein the crystalline polyamide ester resin is left in a convection oven at 200° C. for 1 hour, then the colors of the crystalline polyamide ester resin are measured in the same manner. Discoloration resistance is estimated by a color variation ($^\Delta$E) calculated by Equation 1.

$$\text{Color variation}(^\Delta E) = \sqrt{(\Delta L^*)^2 + (\Delta a^*)^2 + (\Delta b^*)^2} \quad (1),$$

wherein $^\Delta L^*$ is a difference in L* values before and after scorch testing, $^\Delta a^*$ is a difference in a* values before and after scorch testing, and $^\Delta b^*$ is a difference in b* values before and after scorch testing.

The crystalline polyamide ester resin has a color variation (SE) of about 10 or less, for example about 5 to about 10, and as another example about 5 to about 8. Within this range, the crystalline polyamide ester resin can exhibit excellent discoloration resistance.

The present invention also relates to a method for preparing the crystalline polyamide ester resin. The method includes: copolymerizing the (A) dicarboxylic acid component, the (B) diamine component and the (C) cyclic aliphatic diol component, wherein the molar ratio ((B):(C)) of the diamine component (B) to the cyclic aliphatic diol component (C) is about 80 to about 99:about 1 to about 20, and wherein the crystalline polyamide ester resin has a melting point (Tm) ranging from about 280° C. to about 320° C. and a crystallization temperature (Tc) ranging from about 260° C. to about 290° C.

In this method, copolymerization may be performed by typical copolymerization, for example, by melting polymerization.

In copolymerization, the polymerization temperature can be about 80° C. to about 300° C., for example about 80° C. to about 280° C., and polymerization pressure can be about 10 kgf/cm$^2$ to about 40 kgf/cm$^2$, without being limited thereto.

In one embodiment, the crystalline polyamide ester resin may be obtained by charging the dicarboxylic acid component (A), the diamine component (B), the cyclic aliphatic diol component (C), a catalyst and water to a reactor, stirring these components at about 80° C. to about 150° C. for about 0.5 hours to about 2 hours, maintaining the mixture at a temperature of about 200° C. to about 280° C. under a pressure of about 10 kgf/cm² to about 40 kgf/cm² for about 2 hours to about 4 hours, reducing the pressure to about 10 kgf/cm² to about 20 kgf/cm², followed by copolymerization for about 1 hour to about 3 hours to obtain a polyamide ester, and solid state polymerization of the polyamide ester at a temperature between a glass transition temperature (Tg) and a melting point (Tm) under a vacuum for about 10 hours to about 30 hours.

In copolymerization, a catalyst may be used. As the catalyst, a phosphorus catalyst may be used. Examples of the phosphorus catalyst may include without limitation phosphoric acid, phosphorus acid, hypophosphorus acid, salts thereof, derivatives thereof, and the like, and combinations thereof. Examples of the phosphorus catalyst may include without limitation phosphoric acid, phosphorus acid, hypophosphorus acid, sodium hypophosphate, sodium hypophosphite, and the like, and combinations thereof.

The catalyst is optionally used in an amount of about 3 parts by weight or less, for example about 0.001 part by weight to about 1 part by weight, for example about 0.01 part by weight to about 0.5 parts by weight, based on about 100 parts by weight of (A)+(B)+(C), without being limited thereto.

In addition, in the method for preparing a crystalline polyamide ester resin, an end-capping agent may be used in an amount, as defined above. By adjusting the content of the end-capping agent, the viscosity of the synthesized crystalline polyamide ester resin can be adjusted.

The present invention further relates to a product (molded article). The product according to the present invention may be produced from the crystalline polyamide ester resin. For example, the crystalline polyamide ester resin may be prepared for use as an LED reflector requiring heat resistance, light resistance, discoloration resistance, moldability, and the like, without being limited thereto. The product according to the present invention may be easily produced by those skilled in the art.

Now, the present invention will be explained in more detail with reference to the following examples. These examples are provided for illustration only and are not to be in any way construed as limiting the present invention.

EXAMPLES

Examples 1 to 3 and Comparative Examples 1 to 4

In accordance with compositions as listed in Table 1, terephthalic acid (TPA) is used as the dicarboxylic acid component (diacid); 1,10-decanediamine (DDA) and 1,12-dodecanediamine (DDDA) are used as the diamine component (diamine); and 1,4-cyclohexane dimethanol (CHDM) is used as the diol component (diol). To a 2 L autoclave, the dicarboxylic acid component, the diamine component, the diol component, 1 part by mole of benzoic acid as an end-capping agent based on 100 parts by mole of the dicarboxylic acid component, the diamine component and the diol component, 0.1 parts by weight of sodium hypophosphite as a catalyst, and 25 parts by weight of water based on 100 parts by weight of the dicarboxylic acid component, the diamine component and the diol component are added, and followed by purging with nitrogen. The resultant mixture is stirred at 130° C. for 60 minutes, heated to 250° C. for 2 hours, left for 3 hours at a pressure of 25 kgf/cm², and then left for 1 hour after reducing the pressure to 15 kgf/cm², thereby preparing a polyamide pre-copolymer. The prepared polyamide pre-copolymer is subjected to solid-state polymerization at 230° C. for 8 hours to obtain a polyamide ester resin.

Comparative Example 5

A polyamide ester resin is obtained in the same manner as in Example 1 except that terephthalic acid (TPA) and isophthalic acid (IPA) are used in combination as the dicarboxylic acid component (diacid); 1,10-decanediamine (DDA) and 1,12-dodecanediamine (DDDA) are used as the diamine component (diamine); and 1,4-cyclohexane dimethanol (CHDM) is used as the diol component (diol) as listed in Table 1.

TABLE 1

| Monomer (mol %) | | Example | | | Comparative Example | | | | |
|---|---|---|---|---|---|---|---|---|---|
| | | 1 | 2 | 3 | 1 | 2 | 3 | 4 | 5 |
| Diacid | TPA | 100 | 100 | 100 | 100 | 100 | 100 | 100 | 60 |
| | IPA | — | — | — | — | — | — | — | 40 |
| Diamine | DDA | 95 | 90 | — | 100 | — | 99.5 | 75 | 100 |
| | DDDA | — | — | 95 | — | 100 | — | — | — |
| Diol | CHDM | 5 | 10 | 5 | — | — | 0.5 | 25 | 10 |
| Molar ratio | [Diamine + Diol]/[Diacid] | 1.01 | 1.015 | 1.005 | 1.01 | 1.01 | 1.005 | 1.005 | 1.01 |

Experimental Example

The polyamide ester resins prepared in Examples and Comparative Examples are examined by measuring melting point, enthalpy of fusion, crystallization temperature, enthalpy of crystallization, glass transition temperature, inherent viscosity, colors (L*, a*, b*) before scorch testing, colors (L*, a*, b*) after scorch testing, and color variation (SE) before and after scorch testing. Results are shown in Table 2.

Method for Evaluation of Physical Properties (1) Melting point, crystallization temperature and glass transition temperature (unit: ° C.): The polyamide ester resins obtained through solid state polymerization in Examples and Comparative Examples are examined using a Different Scanning calorimeter (DSC). The DSC is equipped with a Q20 made by TA Instrument Inc. Measurement is performed at temperatures from 30° C. to 400° C. at a heating rate of 10° C./min and a cooling rate of 10° C./min under a nitrogen atmosphere. The crystallization temperature is determined by the highest point of exothermic peaks upon cooling. The melting point is determined by the highest point of endothermic peaks upon second heating. Further, the glass transition temperature is determined by the temperature measured upon second heating.

(2) Enthalpy of fusion and enthalpy of crystallization (unit: J/g): Enthalpy of crystallization is obtained by DSC by integrating the area of exothermic peaks upon cooling. Enthalpy of fusion is obtained by integrating the area of endothermic peaks upon second heating.

(3) Inherent viscosity (unit: dL/g): Inherent viscosity is measured using an Ubbelohde viscometer in 98% sulfuric acid solution (Comparative Examples 1~2) or o-chlorophenol (Examples 1~3, Comparative Examples 3~5) at 25° C.

(4) Brightness (L*): L* value is measured using a colorimeter in accordance with ASTM D 1209.

(5) Discoloration resistance: Discoloration resistance is evaluated according to the color variation (ΔE) before and after scorch testing. The colors (L*, a*, b*) of the prepared crystalline polyamide ester resins are measured in accordance with ASTM D 1209, followed by scorch testing in which the crystalline polyamide ester resin is left in a convection oven at 200° C. for 1 hour. Then, the colors of the crystalline polyamide ester resin are measured in the same manner. Discoloration resistance is estimated by a color variation (E) calculated by Equation 1.

$$\text{Color variation}(\Delta E) = \sqrt{(\Delta L^*)^2 + (\Delta a^*)^2 + (\Delta b^*)^2} \quad (1),$$

wherein $\Delta L^*$ is a difference in L* values before and after scorch testing, $\Delta a^*$ is a difference in a* values before and after scorch testing, and $\Delta b^*$ is a difference in b* values before and after scorch testing.

TABLE 2

|  | Example | | | Comparative Example | | | | |
| --- | --- | --- | --- | --- | --- | --- | --- | --- |
|  | 1 | 2 | 3 | 1 | 2 | 3 | 4 | 5 |
| Melting point (° C.) | 309 | 306 | 294 | 312 | 291 | 310 | 290 | — |
| Enthalpy of fusion (J/g) | 62 | 80 | 45 | 88 | 46 | 80 | 40 | — |
| Crystallization temperature (° C.) | 280 | 275 | 265 | 283 | 272 | 282 | 255 | — |
| Enthalpy of crystallization (J/g) | 47 | 56 | 45 | 50 | 37 | 45 | 36 | — |
| Glass transition temperature (° C.) | 118 | 115 | 116 | 120 | 118 | 120 | 106 | 116 |
| Inherent viscosity (dL/g) | 0.85 | 0.86 | 0.85 | 0.86 | 0.82 | 0.83 | 0.85 | 0.83 |
| Brightness (L*) before scorch testing | 92 | 92 | 93 | 92 | 93 | 91 | 90 | 89 |
| Brightness (L*) after scorch testing | 89 | 90 | 91 | 88 | 89 | 87 | 87 | 85 |
| Color variation (ΔE) before and after scorch testing | 6 | 5 | 5 | 12 | 11 | 11 | 12 | 15 |

In Table 2, it can be seen that the polyamide ester resins (Examples 1 to 4) have a glass transition temperature of 110° C. or less and thus exhibit excellent heat resistance. Further, from the measurement results of melting point and crystallization temperature, it can be seen that these polyamide ester resins have excellent crystallinity and moldability. In addition, it can be seen that these polyamide ester resins have excellent discoloration resistance from the color variation (ΔE) before and after scorch testing.

In Comparative Examples 1 to 3 wherein the cyclic aliphatic diol component is not used, and Comparative Examples 4 to 5 wherein the molar ratio of the diamine component (B) to the cyclic aliphatic diol component (C), i.e., (B):(C), deviated from about 80 to about 99:about 1 to about 20, the polyamide ester resins have a high color variation (ΔE) before and after scorch testing, and thus have low discoloration resistance. Further, it can be seen that a non-crystalline polyamide ester resin (Comparative Example 5) exhibits no crystallinity and undesirable discoloration resistance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A crystalline polyamide ester resin prepared by copolymerizing (A) a dicarboxylic acid component, (B) a diamine component, and (C) a cyclic aliphatic diol component, the crystalline polyamide ester resin having a structure in which a dicarboxylic acid moiety derived from the dicarboxylic acid component (A), a diamine moiety derived from the diamine component (B) and a cyclic aliphatic diol moiety derived from the cyclic aliphatic diol component (C) are repeated,
   wherein a molar ratio of the diamine component (B) to the cyclic aliphatic diol component (C) ((B):(C)) is about 80 to about 99:about 1 to about 20, and
   wherein the crystalline polyamide ester resin has a melting point (Tm) ranging from about 280° C. to about 320° C. and a crystallization temperature (Tc) ranging from about 260° C. to about 290° C.

2. The crystalline polyamide ester resin according to claim 1, wherein the dicarboxylic acid component (A) includes a $C_8$ to $C_{20}$ aromatic dicarboxylic acid component, a $C_8$ to $C_{20}$ cyclic (aliphatic) dicarboxylic acid component, or a combination thereof.

3. The crystalline polyamide ester resin according to claim 1, wherein the diamine component (B) includes a $C_4$ to $C_{20}$ aliphatic diamine component or a combination thereof.

4. The crystalline polyamide ester resin according to claim 1, wherein the cyclic aliphatic diol component (C) includes a $C_8$ to $C_{20}$ cyclic aliphatic diol component or a combination thereof.

5. The crystalline polyamide ester resin according to claim 1, wherein the crystalline polyamide ester resin has a glass transition temperature (Tg) ranging from about 110° C. to about 140° C.

6. The crystalline polyamide ester resin according to claim 1, wherein the crystalline polyamide ester resin has an enthalpy of fusion ranging from about 40 J/g to about 80 J/g.

7. The crystalline polyamide ester resin according to claim 1, wherein the crystalline polyamide ester resin has an enthalpy of crystallization ranging from about 40 J/g to about 60 J/g.

8. The crystalline polyamide ester resin according to claim 1, wherein the crystalline polyamide ester resin has an inherent viscosity from about 0.6 dL/g to about 1.0 dL/g.

9. The crystalline polyamide ester resin according to claim 1, wherein the crystalline polyamide ester resin has a color variation ΔE of about 10 or less after being left at 200° C. for 1 hour.

10. The crystalline polyamide ester resin according to claim 1, wherein a terminal group of the crystalline polyamide ester resin is encapsulated by an end-capping agent including an aliphatic carboxylic acid, an aromatic carboxylic acid, or a combination thereof.

11. The crystalline polyamide ester resin according to claim 10, wherein the end-capping agent includes acetic acid, propionic acid, butyric acid, valeric acid, caproic acid, caprylic acid, lauric acid, tridecanoic acid, myristic acid, palmitic acid, stearic acid, pivalic acid, isobutyric acid, benzoic acid, toluic acid, α-naphthalene carboxylic acid, β-naphthalene carboxylic acid, methylnaphthalene carboxylic acid, or a combination thereof.

12. A method for preparing a crystalline polyamide ester resin, comprising:
  copolymerizing (A) a dicarboxylic acid component, (B) a diamine component, and (C) a cyclic aliphatic diol component,
  wherein a molar ratio ((B):(C)) of the diamine component (B) to the cyclic aliphatic diol component (C) is about 80 to about 99:about 1 to about 20, and
  wherein the crystalline polyamide ester resin has a melting point (Tm) ranging from about 280° C. to about 320° C. and a crystallization temperature (Tc) ranging from about 260° C. to about 290° C.

13. A molded article produced from the crystalline polyamide ester resin according to claim 1.

* * * * *